(12) United States Patent
Macnally et al.

(10) Patent No.: US 7,065,327 B1
(45) Date of Patent: Jun. 20, 2006

(54) SINGLE-CHIP CMOS DIRECT-CONVERSION TRANSCEIVER

(75) Inventors: Donald Evan Macnally, San Francisco, CA (US); Thomas B. Cho, Alameda, CA (US); Shahriar Rabii, Palo Alto, CA (US); Srenik Suresh Mehta, Pleasanton, CA (US); Christopher Donald Nilson, San Jose, CA (US); Michael Peter Mack, San Francisco, CA (US); Laurence Marguerite Plouvier, San Francisco, CA (US); Menno Marringa, San Francisco, CA (US); Eric S. Dukatz, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/762,720

(22) PCT Filed: Sep. 10, 1999

(86) PCT No.: PCT/US99/20792

§ 371 (c)(1),
(2), (4) Date: Nov. 20, 2001

(87) PCT Pub. No.: WO00/16492

PCT Pub. Date: Mar. 23, 2000

Related U.S. Application Data

(60) Provisional application No. 60/099,723, filed on Sep. 10, 1998.

(51) Int. Cl.
*H04B 1/44* (2006.01)
(52) U.S. Cl. ............................ 455/78; 455/83

(58) Field of Classification Search ................ 370/280, 370/294; 455/73, 76, 78, 82, 83, 183.1
See application file for complete search history.

(56) References Cited

U.S. PATENT DOCUMENTS

| | | |
|---|---|---|
| 4,944,025 A | 7/1990 | Gehring et al. |
| 5,052,050 A | 9/1991 | Collier et al. |
| 5,091,921 A | 2/1992 | Minami |
| 5,095,533 A | 3/1992 | Loper et al. |
| 5,095,536 A | 3/1992 | Loper |
| 5,179,730 A | 1/1993 | Loper |
| 5,230,099 A | 7/1993 | Loper |
| 5,241,702 A | 8/1993 | Dent |
| 5,249,203 A | 9/1993 | Loper |
| 5,303,417 A | 4/1994 | Laws |
| 5,323,425 A | 6/1994 | Colamonico et al. |
| 5,355,524 A | 10/1994 | Higgins, Jr. |
| 5,361,408 A | 11/1994 | Watanabe et al. |
| 5,414,736 A | 5/1995 | Hasegawa et al. |
| 5,416,803 A | 5/1995 | Janer |
| 5,418,489 A | 5/1995 | Traylor |
| 5,422,889 A | 6/1995 | Sevenhans et al. |

(Continued)

*Primary Examiner*—Bing Q. Bui
(74) *Attorney, Agent, or Firm*—Blakely, Sokoloff, Taylor & Zafman LLP

(57) ABSTRACT

A single-chip CMOS direct conversion transceiver includes an RF circuit, a transmitter having a synthesizer, a receiver having a baseband filter, and a demodulator. The synthesizer is coupled to the RF circuit. The baseband filter is coupled to the RF circuit and the synthesizer. The demodulator is coupled to the baseband filter. The RF circuit, the synthesizer, the baseband filter, and the demodulator are arranged and configured in CMOS devices and provide a complete interface between an antenna and a voiceband codec.

14 Claims, 16 Drawing Sheets

U.S. PATENT DOCUMENTS

| | | |
|---|---|---|
| 5,438,692 A | 8/1995 | Mohindra |
| 5,451,899 A | 9/1995 | Lawton |
| 5,507,036 A | 4/1996 | Vagher |
| 5,539,779 A | 7/1996 | Nagahori |
| 5,579,347 A | 11/1996 | Lindquist et al. |
| 5,584,068 A | 12/1996 | Mohindra |
| 5,604,929 A | 2/1997 | Loper et al. |
| 5,640,428 A | 6/1997 | Abe et al. |
| 5,712,637 A | 1/1998 | Lindquist et al. |
| 5,757,921 A | 5/1998 | Okanobu et al. |
| 6,411,611 B1 * | 6/2002 | van der Tuijn ............ 370/337 |
| 6,600,662 B1 * | 7/2003 | Emmert et al. ............ 361/814 |

* cited by examiner

FIG. 5

Receiver
Sensitivity — −104dBm
Dynamic Range — 110dB
Noise figure (DSB) — 4.5dB
IIP2 (high gain) — +22dBm
IIP3 (high gain) — −21dBm
Selectivity (co-channel, 1.5MHz, 3MHz) — 3dB, 23dB, 57dB
Blocking (4.5MHz) — 67dB
Power dissipation (3.3V) — 525mW Transmitter
Output power (into 50Ω) — 2, 8, 14, 20dBm
Bandwidth — 1.5MHz
Modulation accuracy — ±1%
Power dissipation (3.3V, 2dBm) — 254mW General
Technology — 0.6-μm 2P3M CMOS
Die area — 5.4mm x 6.7mm

SINGLE-CHIP CMOS DIRECT-CONVERSION TRANSCEIVER

This application claims the benefit of Provisional Application No. 60/099,723, filed Sep. 10, 1998.

BACKGROUND OF THE INVENTION

1. Field of the Invention

This invention relates in general to communication systems, and more particularly to a single-chip CMOS direct-conversion transceiver.

2. Description of Related Art

Today's wireless communications markets are being driven by a multitude of user benefits. Products such as cellular phones, cordless phones, pagers, and the like have freed corporate and individual users from their desks and homes and are driving the demand for additional equipment and systems to increase their utility. As a result digital radio personal communications devices will play an increasingly important role in the overall communications infrastructure in the next decade.

Mixed-signal integration and power management have taken on added importance now that analog and mixed analog-digital ICs have become the fastest-growing segment of the semiconductor industry. Integration strategies for multimedia consoles, cellular telephones and battery-powered portables are being developed, as well as applications for less integrated but highly specialized building blocks that serve multiple markets. These building blocks include data converters, amplifiers and voltage regulators. Makers of amplifiers and regulators often eschew integration in CMOS, but strive for compact size and reduced costs with microminiature packaging.

One important aspect of digital radio personal communications devices is the integration of the RF sections of transceivers. Compared to other types of integrated circuits, the level of integration in the RF sections of transceivers is still relatively low. Considerations of power dissipation, form factor, and cost dictate that the RF/IF portions of these devices evolve to higher levels of integration than is true at present. Nevertheless, there are some key barriers to realizing these higher levels of integration.

A high level of integration is critical in lowering the cost of electronics for communication systems such as cellular phones, cordless phones, and wireless LANs. Increasing levels of transceiver integration are being reported, e.g., RF, baseband analog, and mixed-signal circuits have been integrated. Further, RF, baseband analog, and voltage-controlled oscillator (VCO) circuits have also been realized in a single die.

It can be seen that there is a need for a fully-integrated transceiver.

It also can be seen that there is a need for a fully-integrated transceiver that incorporates RF circuits, synthesizer, baseband filters, demodulator, and extensive digital control functions.

SUMMARY OF THE INVENTION

To overcome the limitations in the prior art described above, and to overcome other limitations that will become apparent upon reading and understanding the present specification, the present invention discloses a single-chip CMOS direct-conversion transceiver.

In one embodiment of the present invention, the single-chip CMOS direct-conversion transceiver includes an RF circuit, a transmitter having a synthesizer, a receiver having a baseband filter, and a demodulator. The synthesizer is coupled to the RF circuit. The baseband filter is coupled to the RF circuit and the synthesizer. The demodulator is coupled to the baseband filter. The RF circuit, the synthesizer, the baseband filter, and the demodulator are arranged and configured in CMOS devices and provide a complete interface between an antenna and a voiceband codec.

Another aspect of the invention is that the transceiver further includes a time-division duplex (TDD) circuit for ensuring isolating between the transmitter and the receiver.

A further aspect of the invention is that the transmitter and the receiver share the same RF port which interfaces with an external antenna.

BRIEF DESCRIPTION OF THE DRAWINGS

Referring now to the drawings in which like reference numbers represent corresponding parts throughout:

FIG. 5 is a table illustrating the performance characteristics of the single-chip CMOS transceiver;

DETAILED DESCRIPTION OF THE INVENTION

Figure 1:
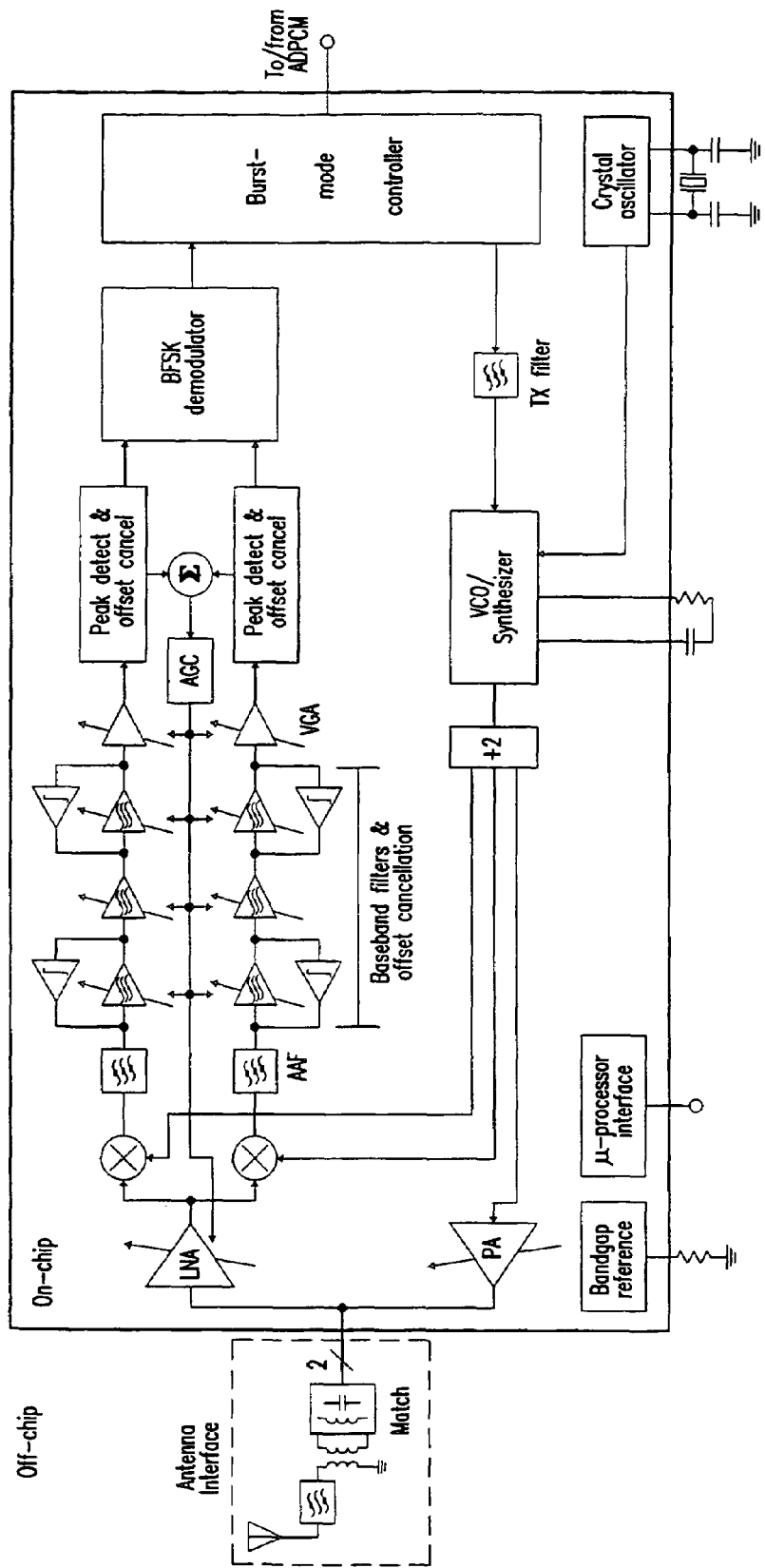
FIG. 1 illustrates a block diagram of the single-chip CMOS transceiver according to the present invention.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

In an embodiment of the present invention is a specific combination of building blocks that realize a monolithic transceiver for digital communication that may be used for various media.

A function of the monolithic transceiver is to convert digital data to an analog signal suitable for transmission and to convert a received analog signal into digital data. In practice, there will be a finite bit error rate in the transmission, propagation and reception processes. The specific BER that is tolerable depends on the application. In some cases, the input to one monolithic transceiver and at the output of another monolithic transceiver may be different because of intentional signal processing.

Typically, a pair of monolithic transceivers is used for full duplex communication. However, more than two monolithic transceivers can be used in more complex communication systems. In some cases, the communication is only required from one point to another without full duplex. In some cases, different media may be used for each direction of a full duplex system. In some cases, the monolithic transceiver may include multiple receivers and transmitters. In some cases, the analog signal may be converted from one media to another along propagation. Each receiver and transmitter in the monolithic transceiver may be intended for different media.

The digital data communicated may originate from an arbitrary source and will be delivered to an arbitrary target. Common sources and targets include: (1) Computers, (2) Sensors, (3) Magnetic or optical media, (4) Other monolithic transceivers.

The analog signal is typically propagated using one or more of the following methods: (5) Free space radiation, (6) Transmission lines: (a) Coaxial cables, (b) Twisted pairs, (c) Waveguides, (7) Fiber optics, (8) Sonar in liquid, solid or gas media.

The elements used in the monolithic transceiver include the following means: (9) Digital processing and control circuits, (10) Analog-to-Digital, Analog, Digital-to-Analog processing circuits, (11) Media interface processing circuits.

The digital processing circuits are used to condition data from a source into internal digital data in the monolithic transceiver destined for transmission and to condition received internal digital data in the monolithic transceiver for a target. The digital control circuits are used to coordinate the activities of the monolithic transceiver necessary to accomplish half-duplex, full-duplex or more complex communication systems and to coordinate digital communication with the source and target.

The analog-to-digital, analog and digital-to-analog processing provides the interface between the digital and analog domains. These functions are commonly accomplished using analog circuits such as analog-to-digital converters (ADCs), digital-to-analog converters (DACs), filters and automatic gain control systems. In some cases, these functions may be part of or inherent to other analog functions such as a demodulator.

The media interface processing circuits provide the interface between the analog domain used for transmission and the analog domain used in the monolithic transceiver. In a RF monolithic transceiver, these interface circuits include a low noise amplifier (LNA), power amplifier (PA), mixer and synthesizer. Each type of media has its own specific interface circuit appropriate for that media.

More specifically, the monolithic transceiver design includes the following choices: (12) Time division duplex (TD) or frequency division duplex (FDD), (13) Modulation technique, (14) Narrow-band or wide-band communication, (15) Direct-sequence or frequency hopping spreading and despreading, (16) Silicon or heterojunction semiconductor platforms, (17) MOS or bipolar devices.

The specific attributes chosen may ease implementation of the monolithic transceiver that may make the monolithic transceiver particularly attractive for certain markets.

More specifically, the use of silicon MOS technologies permits the monolithic transceiver to take an advantage of attributes of MOS devices in general and to take an advantage of attributes of short-channel MOS devices in modern CMOS technologies for particular wireless applications.

The use of MOS devices permits the digital processing and control circuits to be accomplished with high density and lower power. This is important because of well-known attributes of MOS devices for logic implementation. This permits implementation of sophisticated digital signal processing for portable wireless applications, as an example.

The use of MOS devices permits analog, A/D, D/A processing circuits to be accomplished using switched-capacitor techniques. This is important because, in general, MOS devices have the attribute of an extremely large on-state to off-state conductance ratio necessary for an excellent switch. This switch is the basis for sampled-charge based approaches. The use of MOS devices permit a rich and sophisticated array of sampled-data systems to be implemented including ADCs, DACs and filters.

The use of MOS devices permits media interface processing circuits to be accomplished using amplifiers, mixers, and frequency synthesizers. In particular, recent advances in short-channel MOS devices permit the media interface processing circuits to be accomplished at microwave frequencies used in many wireless applications.

More specifically, the use of Bipolar or BiCMOS technology may be used to implement the monolithic transceiver.

The use of BiCMOS technology can be used to accomplish a monolithic transceiver with the digital processing and control circuits using CMOS devices, the analog, A/D, D/A circuits and the media interface processing circuits using a combination of bipolar or CMOS devices.

The use of bipolar technology can be used to accomplish the monolithic transceiver. This approach may be better for specialized applications such as millimeter wave systems where HBT devices are more appropriate. Other applications where bipolar devices may be a better choice include fiber-optic applications.

The use of bipolar devices does not permit the digital processing and control circuits to be accomplished with high density or low power. However, high speed may be the advantage.

The use of bipolar devices does not permit the analog, A/D, D/A circuits to use switched-capacitor techniques. This is a major limitation because of sophistication possible with switched-capacitor sampled-data systems. The bipolar device can be used to implement sampled-data systems using other techniques such as switched-current approaches. However, sampled-data systems built with these approaches are far less flexible and use far more power than switched-capacitor techniques.

The use of bipolar devices does permit the media interface processing circuits to be accomplished with more ease at present. However, future advances in CMOS process technology may favor CMOS devices for the media interface processing circuits.

More specifically, the choice of modulation technique influences the complexity of certain blocks. For example, the use of FSK modulation relaxes the linearity requirement of the PA. This is important as at present, CMOS PAs are not easily accomplished with high linearity.

The following description discusses one embodiment of a monolithic transceiver implementation that uses CMOS technology, FSK modulation, switched-capacitor techniques for sampled-data systems and a relatively complex digital signal processor and control unit.

In one embodiment, the present invention provides a single-chip CMOS direct-conversion transceiver. As stated above, a high level of integration is critical in lowering the cost of electronics for communication systems such as cellular phones, cordless phones, and wireless LANs. The present invention provides a fully-integrated transceiver 100, shown in FIG. 1, that incorporates RF circuits 102, 104, synthesizer 106, baseband filters 108, demodulator 110, and digital signal processing. The few off-chip components include an ISM band filter 112, a balun 114, an RF matching network 116, an RC loop filter for the PLL 118, a crystal resonator 120, and a resistor 122 for biasing. The use of a transmit/receive (TIR) switch is avoided by sharing a single RF port between a transmitter 124 and a receiver 126. An offset cancellation method attenuates offsets in the baseband without sacrificing bandwidth in the direct conversion receiver 126. Careful circuit, timing, and layout considerations provide isolation between the sensitive RF signal and the digital switching noise. The IC has been fabricated in 0.6-µm CMOS and provides a complete interface between an antenna 128 and a voiceband codec 130.

Architectural and circuit techniques have made it possible to achieve this level of integration without sacrificing performance. Time-division duplex (TDD) ensures isolation between the transmitter 124 and the receiver 126. Direct conversion makes it possible to eliminate expensive, off-chip radio frequency (RF) image reject filters and diplexer, and to replace off-chip intermediate frequency (IF) channel select filters with on-chip low pass filters.

Active on-chip offset reduction by means of feedback and feedforward loops has been combined with a digitally controlled automatic gain control (AGC) circuit 132 that settles within the 160-µs preamble of the receive burst.

In a direct conversion receiver 126, static and varying DC offsets within the base band I and Q channel amplifiers and filters limit the architecture's usefulness. In the past, AC coupling or high pass filtering has been used to remove the DC offset from the signal. However, this removes some of the useful DC or near DC energy from the signal causing degradation to the signal. The present invention uses a combined feedback and feedforward offset cancellation technique with DC signal response to cancel the DC offset problem while at the same time providing for a DC response to the base band signals of interest.

The main feature of the feed forward offset cancellation architecture is its capability to cancel low frequency (DC to 5 kHz) offsets caused by LO leakage and other non-ideal component induced offsets while at the same time maintaining a DC response to the signal. This is accomplished by two main components of the architecture.

The first main component is the signal format. A signal format was chosen such that the I and Q base band signals exhibit a positive and negative peak within a certain time frame, 6.66 micro-seconds was chosen. The peaks and valleys of the I and Q signals from one time frame to the next are required to be approximately equal.

The second main component is a positive and negative peak detector which determines the peaks and valleys of the signal over a certain time frame (6.66 uS). The offset is then the addition of the positive and negative peaks divided by two.

A fully-differential analog signal path minimizes supply and substrate noise coupling. To further reduce coupling, transitions of digital signals have been minimized near the sampling edge of baseband switched-capacitor circuits. Source-coupled logic has been utilized in the PLL frequency dividers to reduce substrate noise injection, while CMOS logic gates have been used in a burst-mode controller (BMC) 134 to achieve low power dissipation and high circuit density. An automatic calibration technique has allowed the integration of a 1.8-GHz LC VCO with a wide tuning range. The receiver 126 has a maximum gain of 106 dB and a sensitivity of −104 dBm.

A low noise amplifier (LNA) 138 and the power amplifier (PA) 104 designs make it possible to share a common RF port 140, thereby eliminating the need for an external transmitter/receiver switch. The transmitter 124 and receiver 126 are attached to the filter/antenna port of a radio transceiver without the need for a costly antenna switch in a time division duplex system.

Radio transceivers usually require both a Low Noise Amplifier or (LNA) for clear reception and a Power Amplifier or (PA) for transmitting over long distances. In a time division duplex or (TDD) transceiver 100, the transmitter 124 and receiver 126 are not utilized simultaneously. When the transmitter 124 is on, the receiver 126 is off, and when the receiver 126 is on, the transmitter 124 is off. For a typical TDD transceiver 100, the receive LNA 138 is powered down during the transmit cycle to conserve power, and the transmit power amplifier 140 is powered down while the receiver 126 is on.

In the past, the LNAs and PAs have been designed utilizing bipolar transistor technology. The bipolar LNAs and PA's are capable of powering down, however their respective input and output impedance while in the powered down state do not allow them to be connected together in a TDD system. The powered down LNA will attenuate the output power of the PA and may even be damaged by the PA. The powered down PA will lower the impedance that the LNA "sees" and will attenuate the incoming signal from the antenna.

To get around the varying impedance problem, LNA and PA typically use their own set of different matching components to produce a 50 Ohm LNA input impedance and 50 Ohm PA output impedance. This topology is then combined with an antenna switch so that the off state impedances of either the LNA or the PA will not harm the 50 match achieved by the different matching components. However, the antenna switch can be costly, and the transmit and receive signals are still attenuated somewhat by the switch itself. In addition a control circuit must be used to switch the antenna switch.

According to the present invention, the antenna interface requires only one RF combined input/output port thereby reducing IC package pin count and the number of external components. An impedance transformation network of 25 to 50 ohm network is used to ease the LNA requirement. A singly matched network is used for PA since putting required matching 50 ohm will limit the theoretical power efficiency to less than 50% and will degrade the power efficiency achieved in practice.

Figure 2:
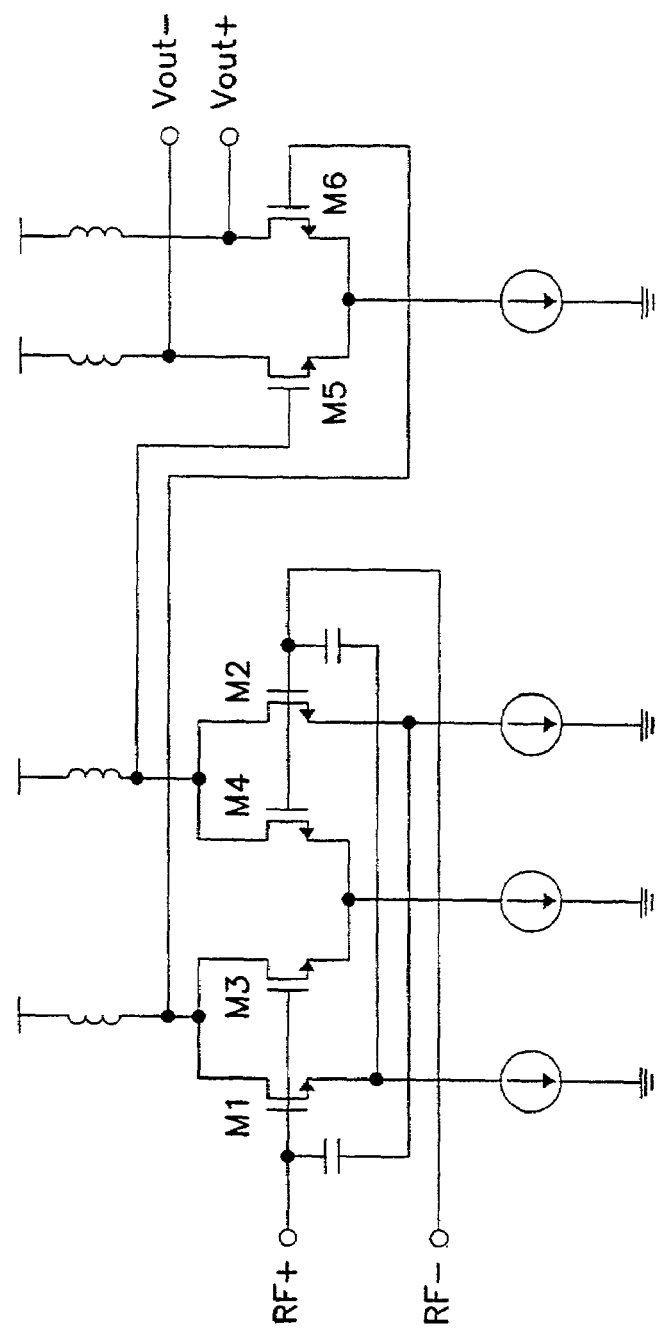
FIG. 2 illustrates the low noise amplifier according to the present invention.

The LNA 138, shown in FIG. 2, is implemented as a cascade of two stages. The first stage employs a capacitively cross-coupled input pair, M1 and M2, that provides both gain and impedance matching in parallel with a differential pair, M3 and M4, for additional gain. The second stage of the LNA 138 is also a differential pair. All gain stages are loaded by on-chip spiral inductors. The combined LNA gain can be set to 12 dB or 28 dB.

Figure 12:
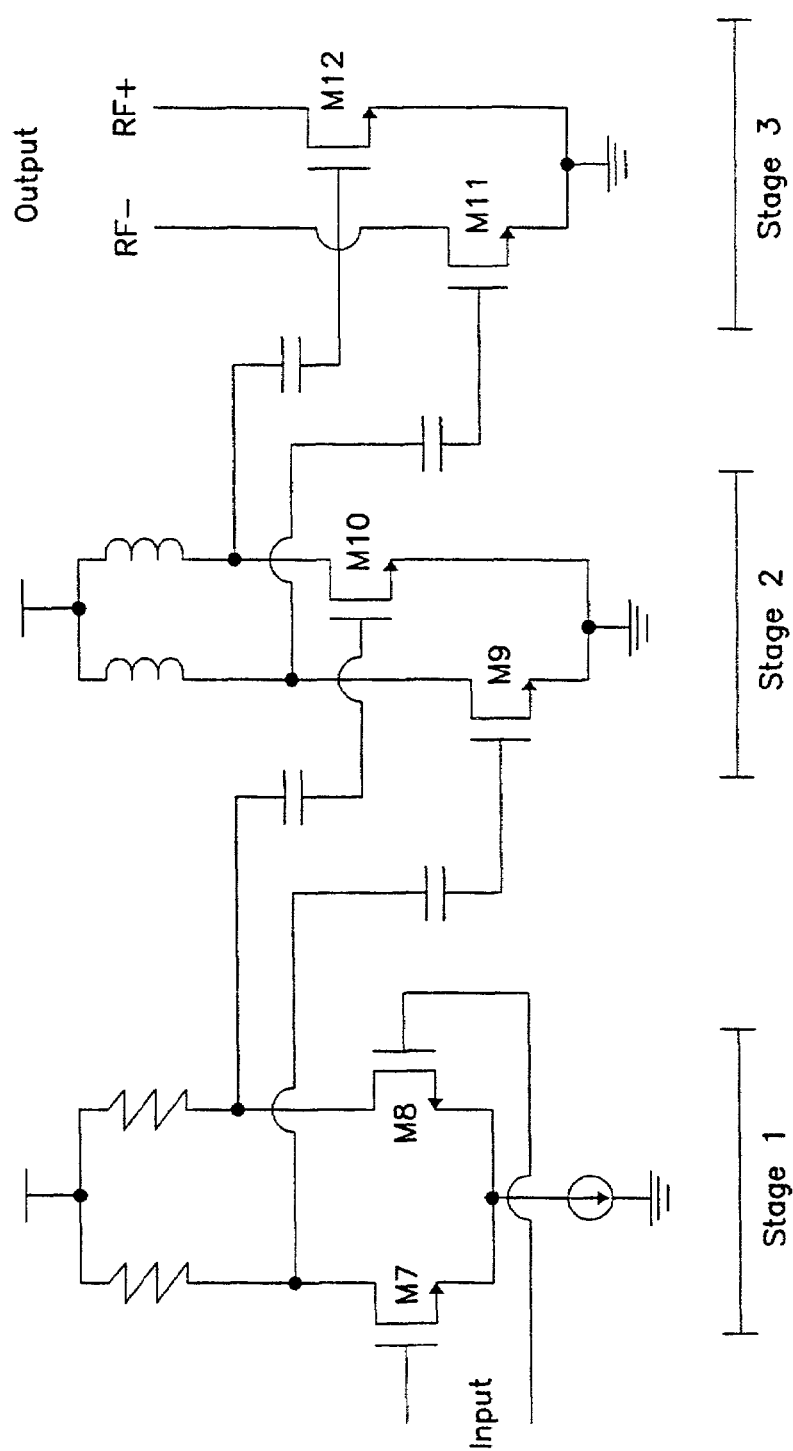
FIG. 12 illustrates a circuit diagram for the power amplifier.

The PA 140 is implemented as a three-stage, class AB amplifier. The first stage is a resistively loaded differential pair, the second stage is a common-source stage loaded with on-chip spiral inductors, and the output stage consists of large open drain devices whose drains are connected to the LNA input. The bias currents of the final stage are provided by off-chip RF chokes. The output power, measured at the balun, can be varied from +2 dBm to +20 dBm. Refer to FIG. 12.

Figure 3:
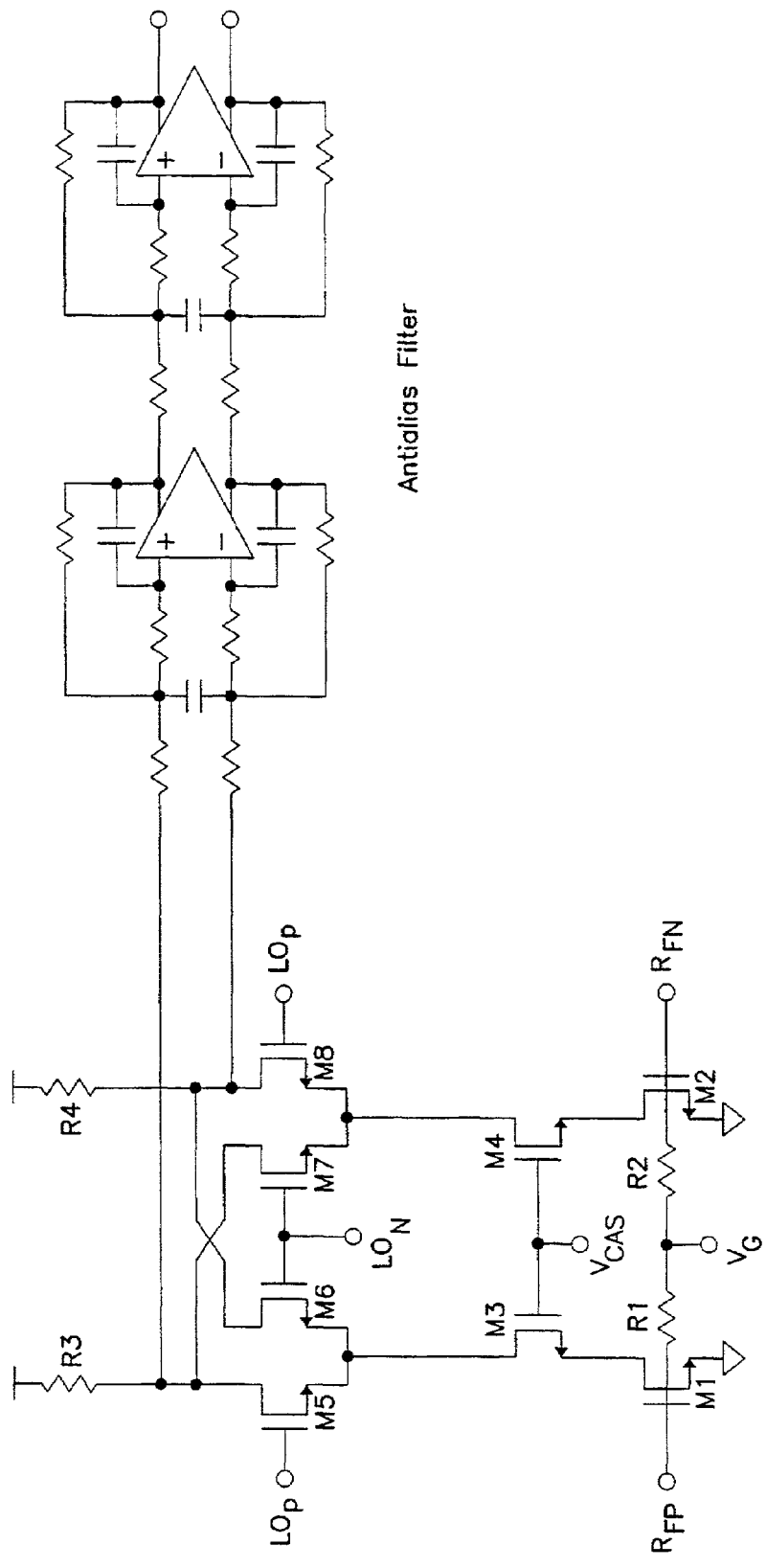
FIG. 3 is a circuit diagram of the mixer and antialias filter according to the present invention.

A diagram of a mixer 142 and antialias filter 144 is shown in FIG. 3. The mixer's conversion gain is 14.3 dB. The mixer uses a double balanced structure without a tail current source to increase headroom. Biasing for the RF input transistors is performed by a replica circuit that suppresses transconductance variations with process and temperature. The LO input transistors operate as switches that steer a process and temperature independent current. The output of the mixer 142 is fed to a four-pole Butterworth antialias filter 144 with a cut-off frequency of 2.4 MHz.

Two biquad stages form the four-pole Butterworth antialias filter 144 with a nominal gain of 15.6 dB and a cut-off frequency of 2.4 MHz. Switched-capacitor I and Q baseband filters sample the output of the antialias filter 144 at 24 MHz, attenuate adjacent channels, and provide AGC 132. Each baseband signal path comprises a fourth-order low pass Chebyshev filter, implemented with two biquad sections, followed by a group delay equalizer (GDE). The biquads and the GDE have a programmable gain of one or four. The filter is followed by a switched-capacitor variable gain amplifier (VGA) that is programmable with a gain of one, two, or four. This arrangement provides a baseband gain of 0 dB to 48 dB in 6 dB steps.

In a direct conversion receiver 126, LO leakage can lead to large offsets at the inputs to the baseband filters 108. Moreover, offsets in the switched-capacitor filter sections can accumulate and render the output signal undetectable. To overcome this problem, feedback integrators cancel offsets in the first biquad and in the GDE, as shown in FIG. 1. To prevent baseline wander from causing errors, the integrators are placed in a hold mode when data is transferred.

Switched-capacitor peak detector circuits 146 sample the maximum and minimum values of the filtered I and Q signals. The AGC controller 132 uses the peak detector 146 outputs to estimate the signal levels and adjusts the baseband gain accordingly. The outputs of the peak detectors 146 are also low pass filtered to estimate the residual offset in the outputs of the channel filters. The offset is then subtracted from the baseband filter output, and the resulting I and Q signals are fed to the BFSK demodulator 110.

Figure 4:
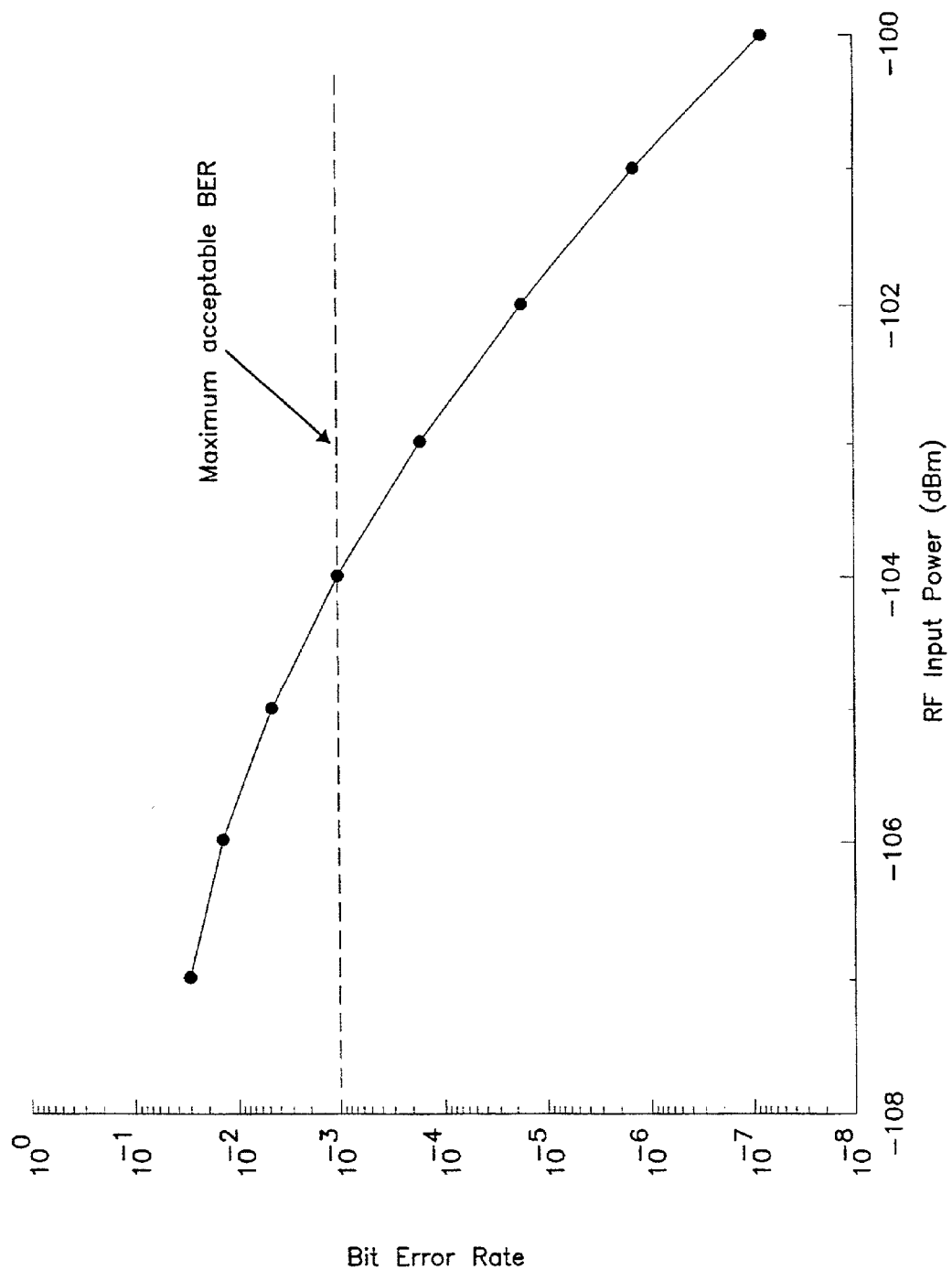
FIG. 4 illustrates a plot of the receiver bit error rate (BER)

The BFSK demodulator 110 is implemented with switched-capacitor circuits clocked at 6 MHz. It generates a digital output based on the direction of rotation of the I/Q constellation. The digital output of the demodulator 110 is processed by the on-chip BMC 134, comprising over 8000 CMOS standard cell gates, that performs clock recovery and direct sequence spreading and despreading. The receiver bit error rate (BER), shown in FIG. 4, illustrates the receiver sensitivity. Selectivity and blocking performance are given in the table in FIG. 5.

Figure 6:
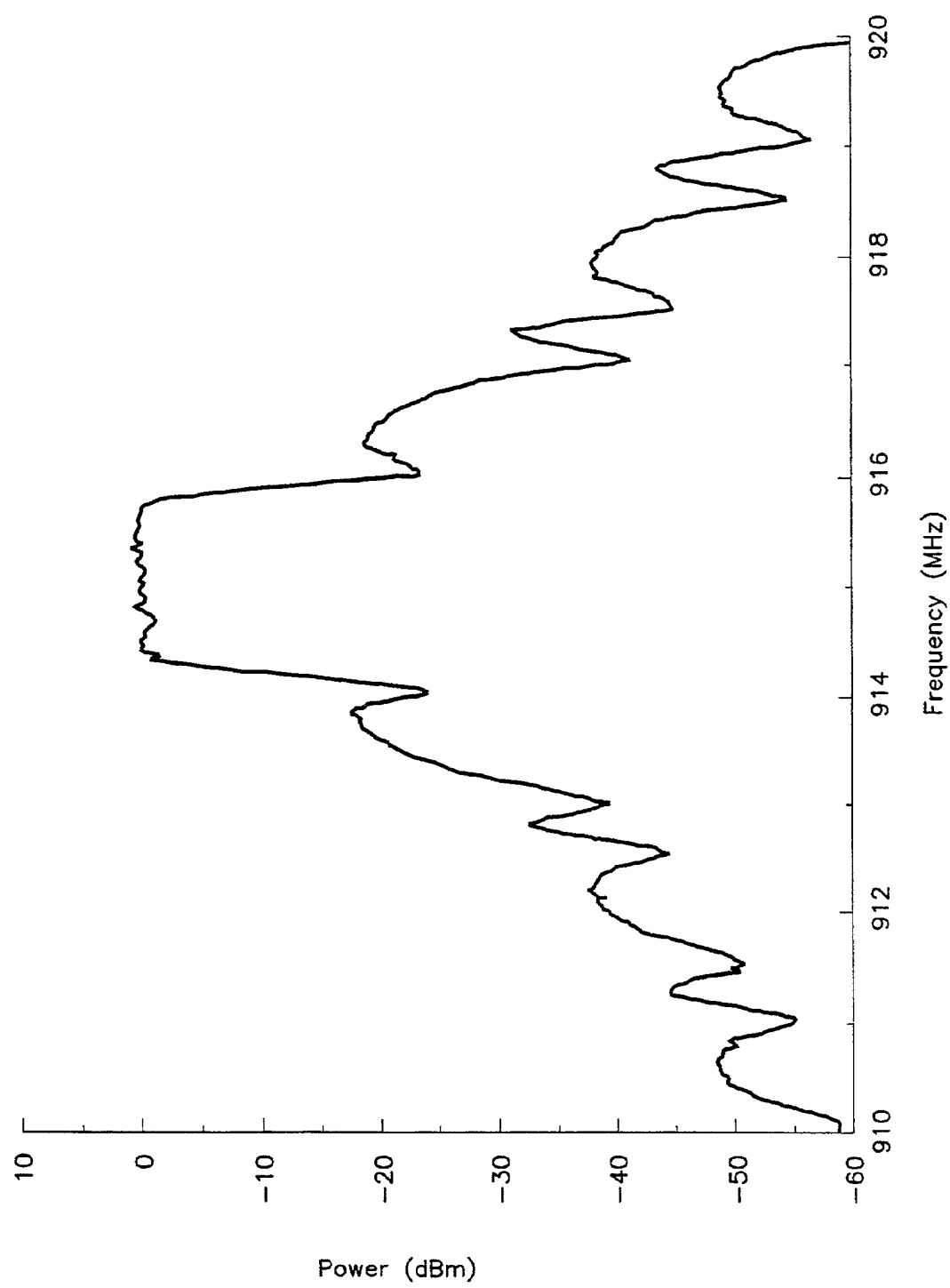
FIG. 6 illustrates the transmit spectrum for 20 dBm output power.
Figure 7:
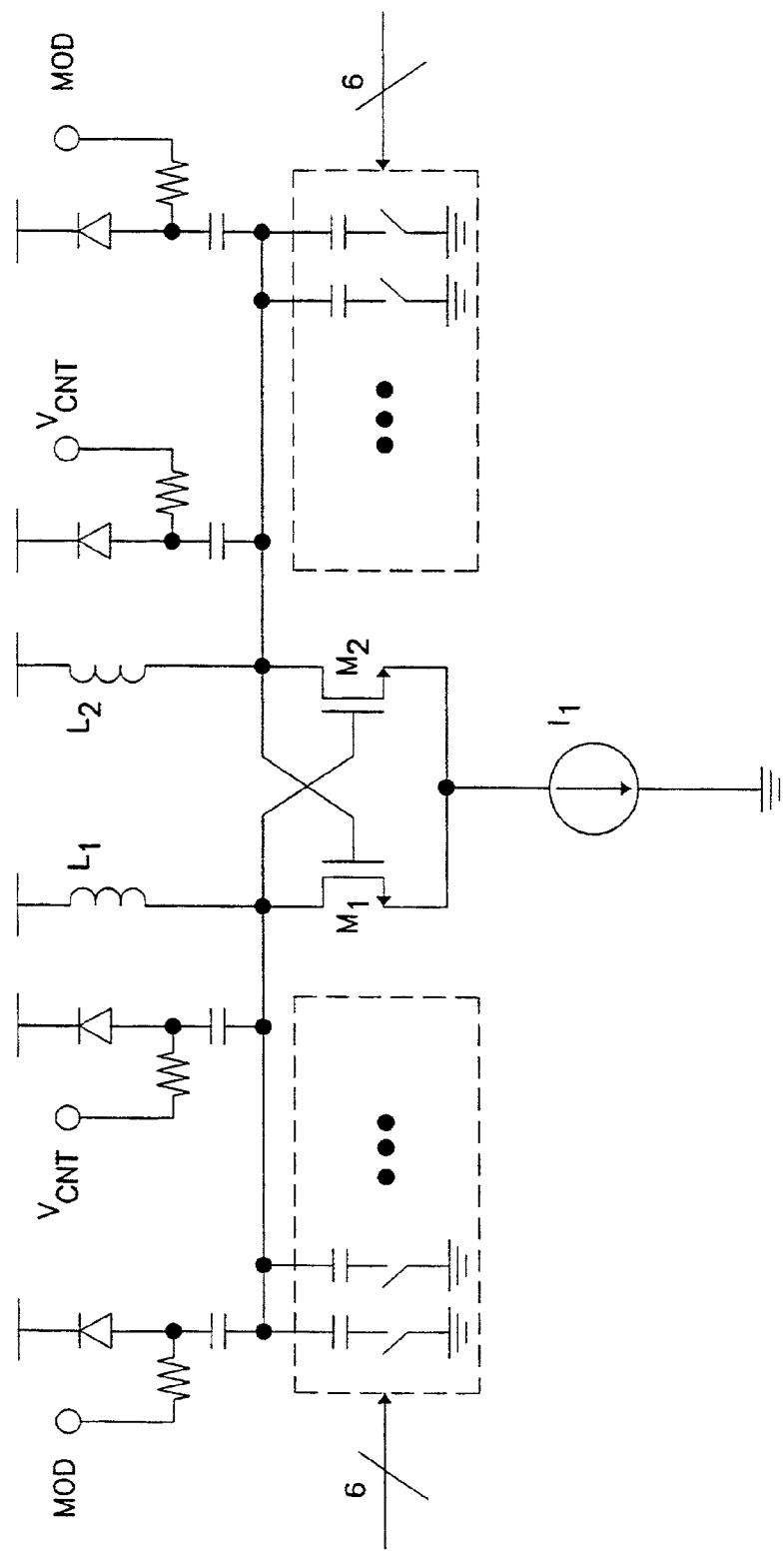
FIG. 7 illustrates the voltage controlled oscillator.

The single frequency synthesizer 106 creates both LO and PA input signals for receive and transmit, respectively. The circuit generates channels from 900 MHz to 930 MHz in 750 kHz increments. During receiving, a divide-by-two circuit creates I and Q LO signals form the output of a VCO operating at twice the desired frequency in a high bandwidth PLL. During transmit, the PLL bandwidth is reduced allowing filtered transmit data to directly modulate the VCO while maintaining a constant center frequency. The transmit spectrum for 20 dBm output power is shown in FIG. 6. The VCO, shown in FIG. 7, is designed as a cross-coupled differential pair loaded by spiral inductors and by capacitors. The load capacitors include ac-coupled channel varactors, modulation varactors, and a bank of capacitors for automatic coarse frequency adjustment.

Figure 8:
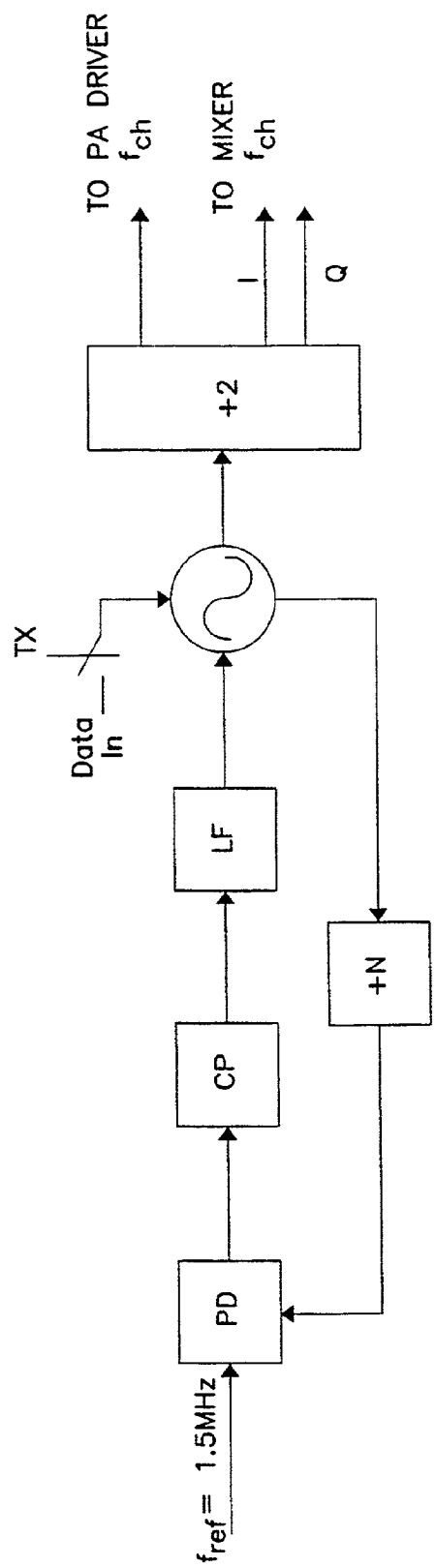
FIG. 8 illustrates a block diagram of the synthesizer.
Figure 9:
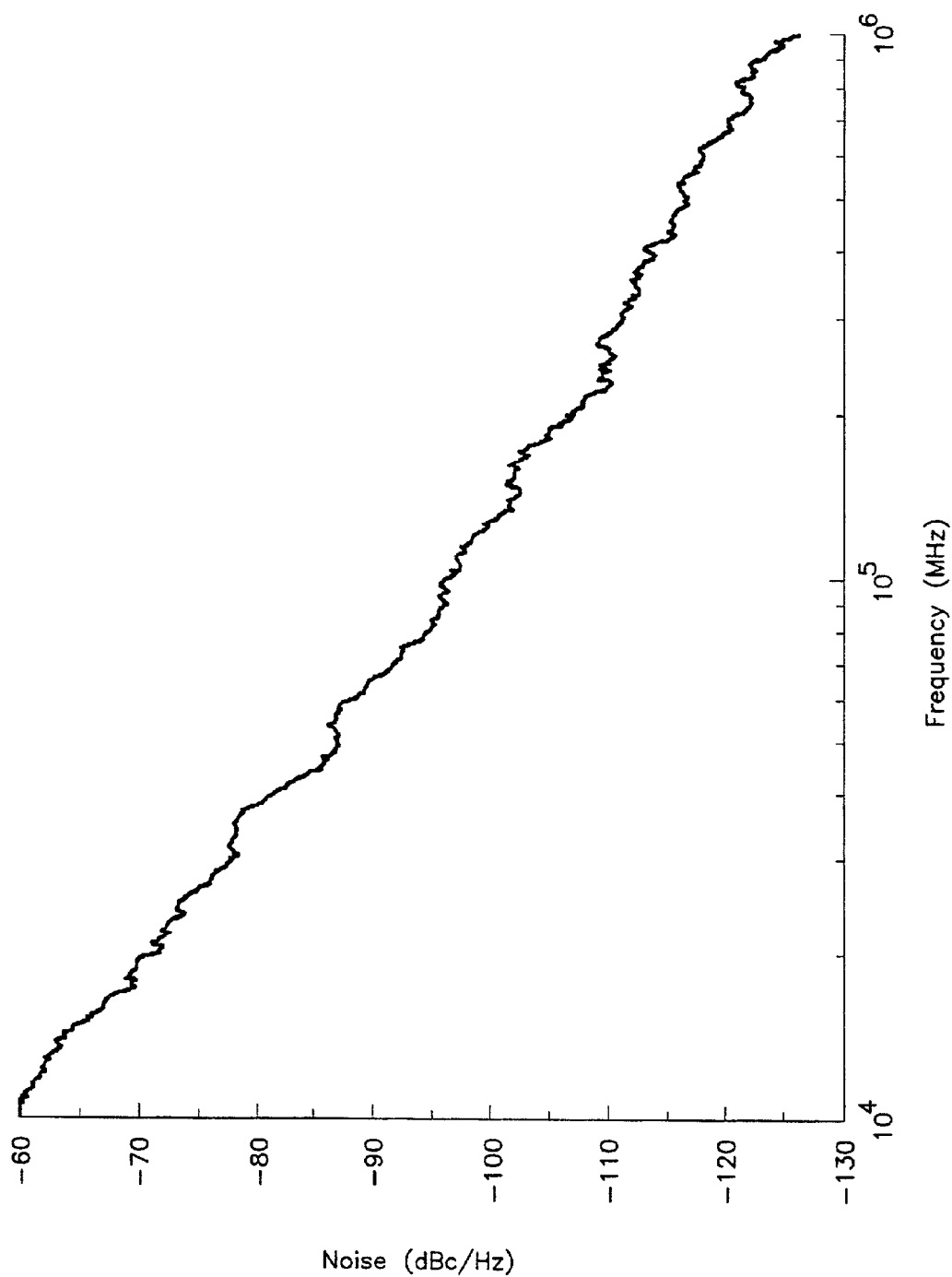
FIG. 9 is a phase noise plot for the single-chip CMOS transceiver.
Figure 10:
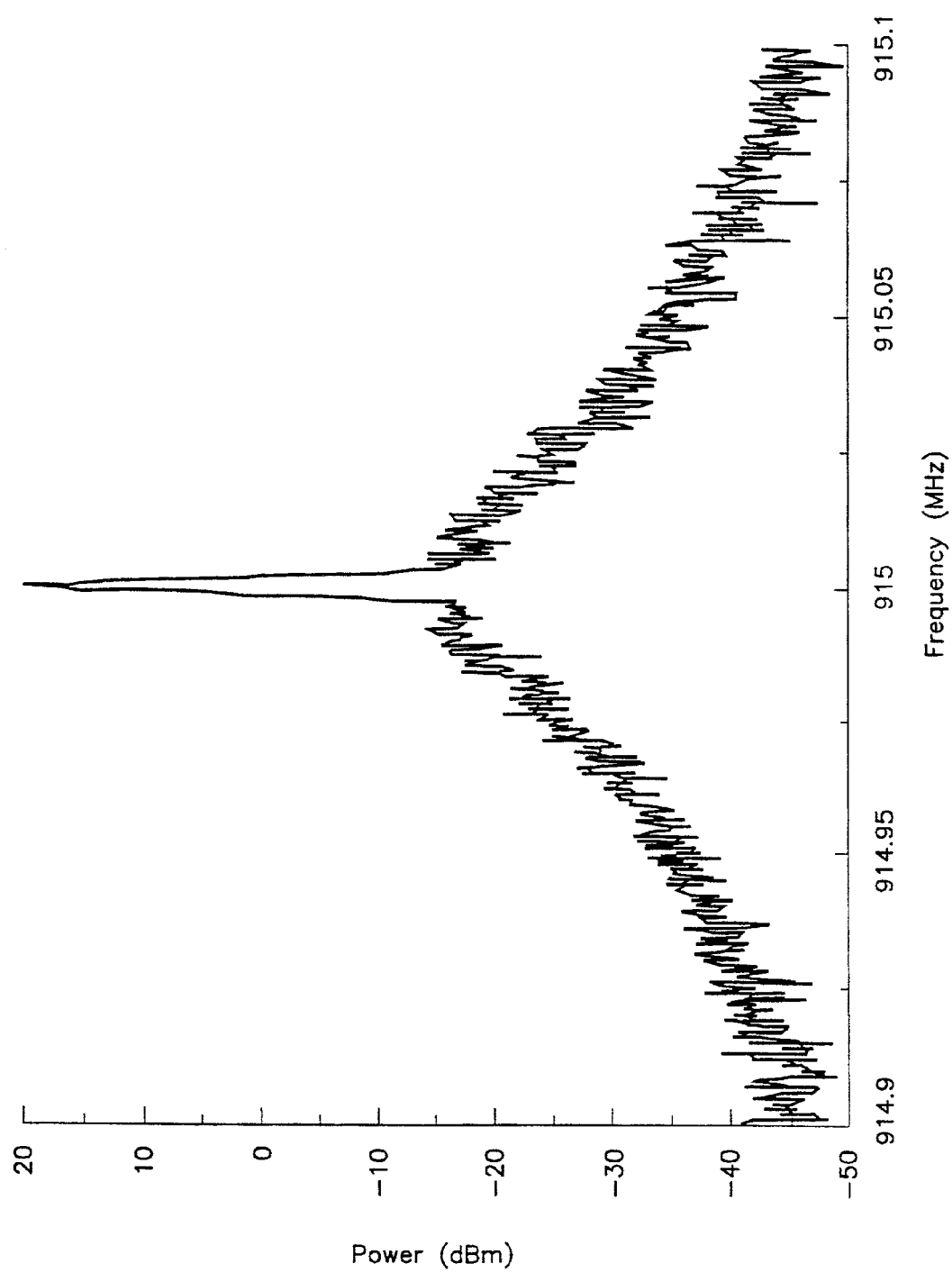
FIG. 10 is a plot of the unmodulated output spectrum for the single-chip CMOS transceiver.

The synthesizer 106 architecture is shown in FIG. 8. The varactors are on chip. The VCO 148 operates at twice the carrier frequency in order to alleviate problems arising from PA pulling. Furthermore, it allows the robust creation of I and Q signals using a simple divide-by-two circuit. A phase noise plot is provided in FIG. 9, and the output spectrum is shown in FIG. 10.

Figure 11:
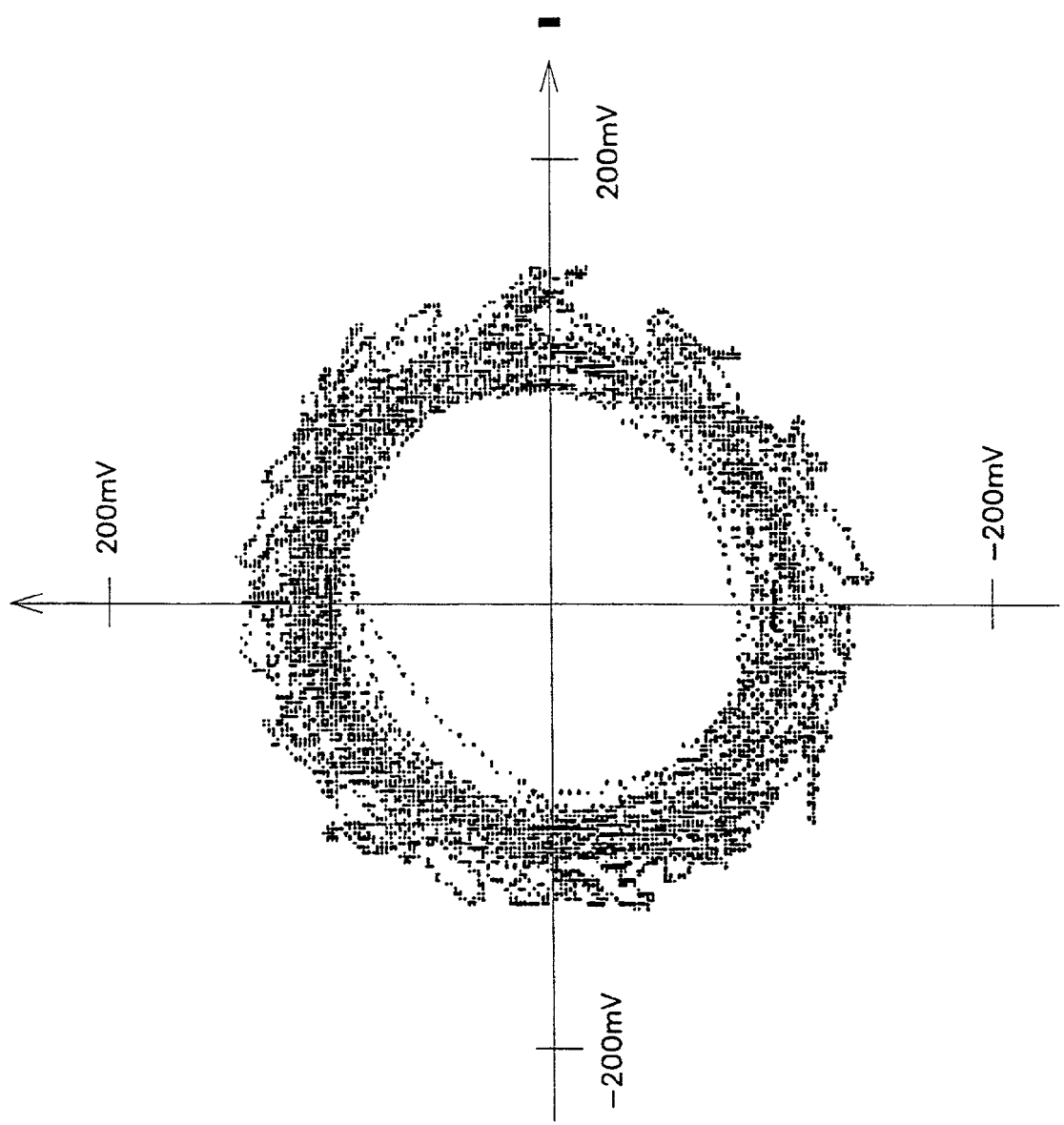
FIG. 11 illustrates the measured I/Q constellation for a −80 dBm RF input.

The VCO 148 is automatically calibrated in a closed loop with control circuitry that digitally adjusts the capacitive load of the tank. The measured I/Q constellation for a −80 dBm RF input is shown in FIG. 11. The PA circuit 140 is illustrated in FIG. 12. The power efficiency of the PA 140 is 20% at +20 dBm.

Figure 13:
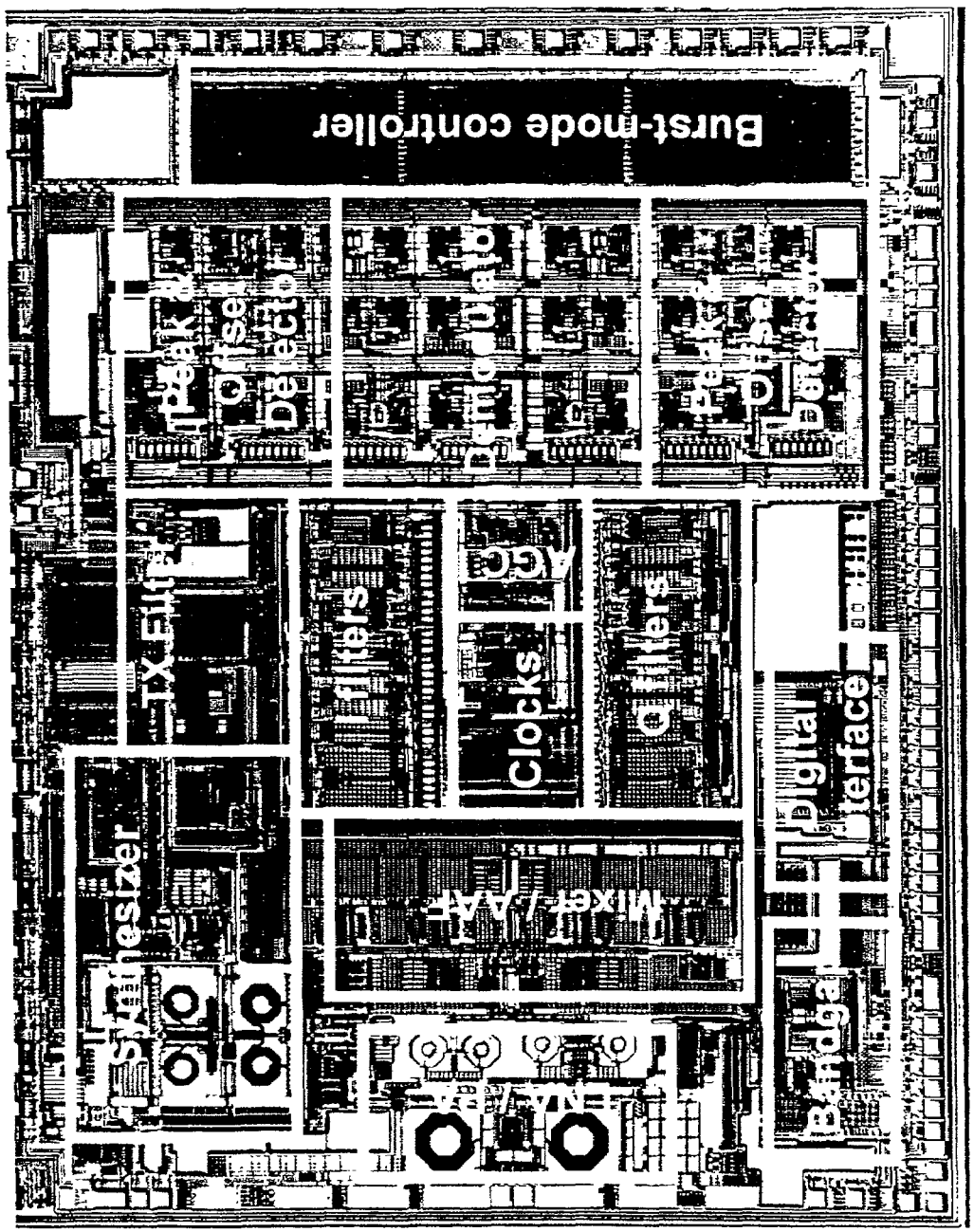
FIG. 13 illustrates the die micrograph of the single-chip CMOS transceiver.

The measured performance, summarized in the table of FIG. 5, demonstrates that a single-chip CMOS transceiver 100 can successfully integrate the RF front end along with baseband analog circuits and a significant amount of standard cell digital circuits. FIG. 13 illustrates the die micrograph of the single-chip CMOS transceiver 100.

Figure 14:
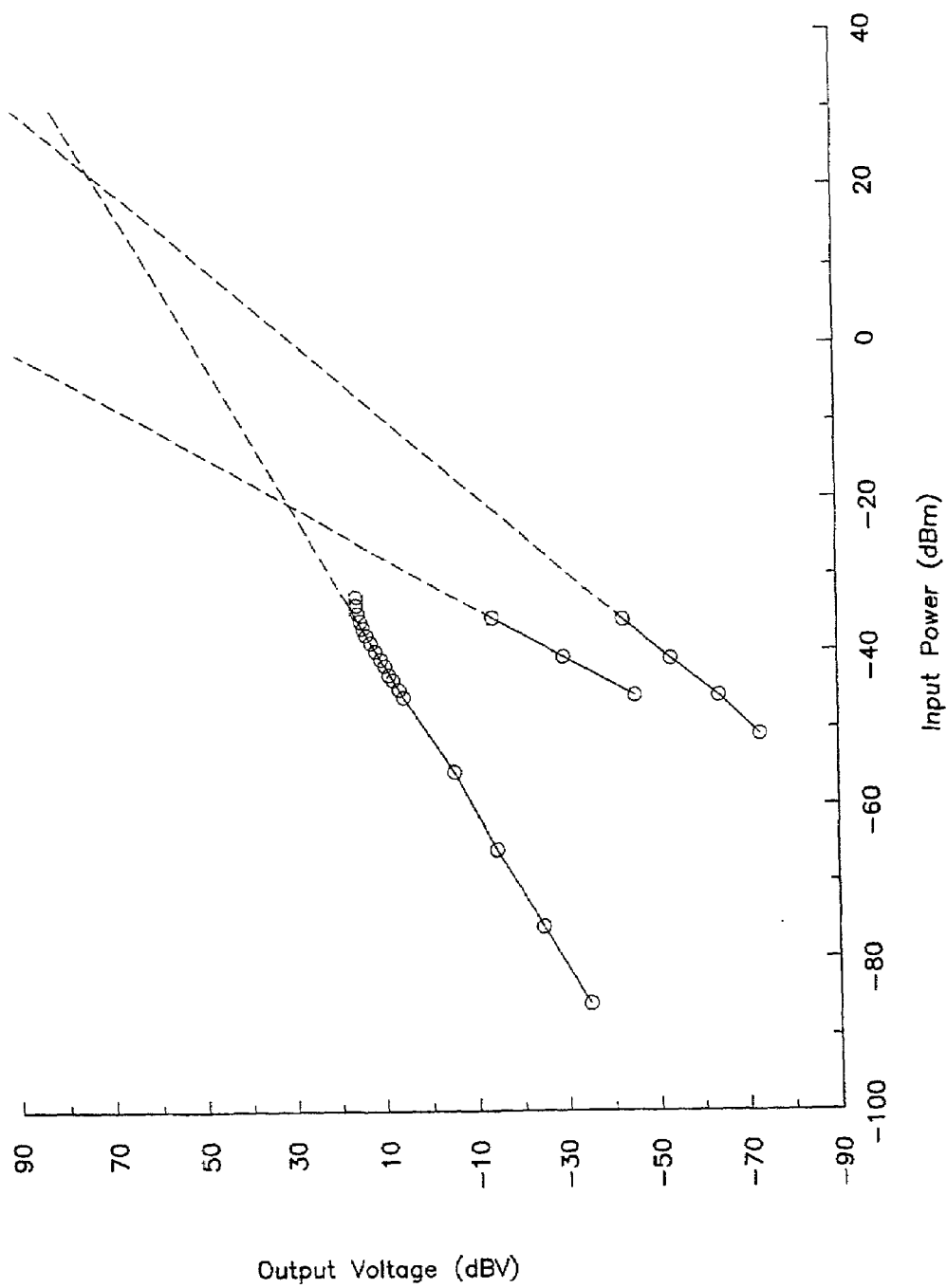
FIG. 14 is the intermodulation (IM) plot for the entire receive path.

The intermodulation (IM) plot for the entire receive path is shown in FIG. 14. This plot was generated by applying two tones that are 6 channels away from the carrier and recording the power of the IM product at the output of the baseband filters. The tones were chosen such that the IM products are well within the bandwidth of the baseband filters 108. The measurements include the influence of on-chip test buffers on the receiver linearity. The input signal power was measured at the input to the chip, and the LNA gain was in its "high" settings. The 1-dB compression point is limited by the switched-capacitor circuits and occurs at approximately 5V differential amplitude.

Figure 15:
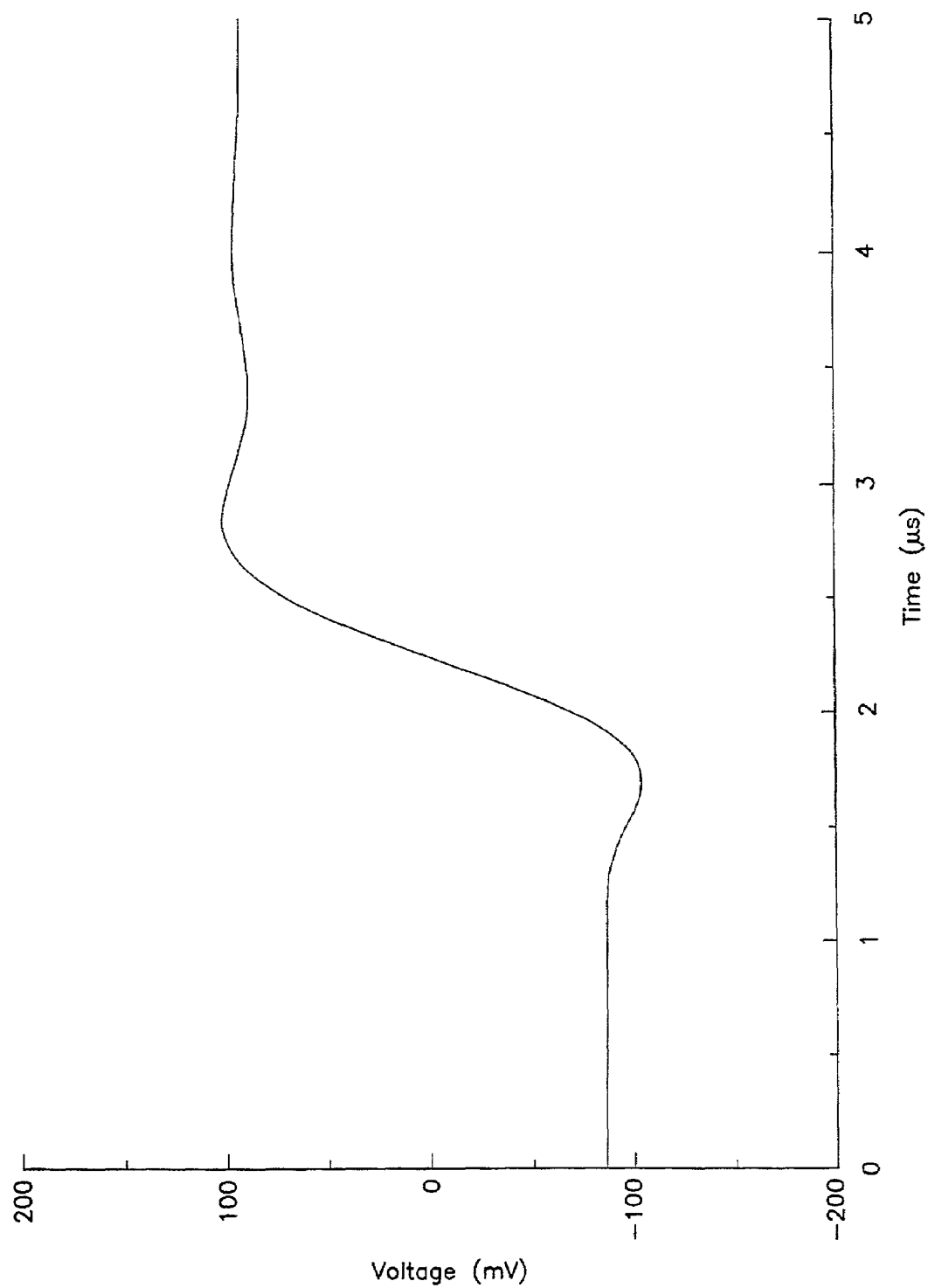
FIG. 15 shows the measured step response of the channel filters.
Figure 16:
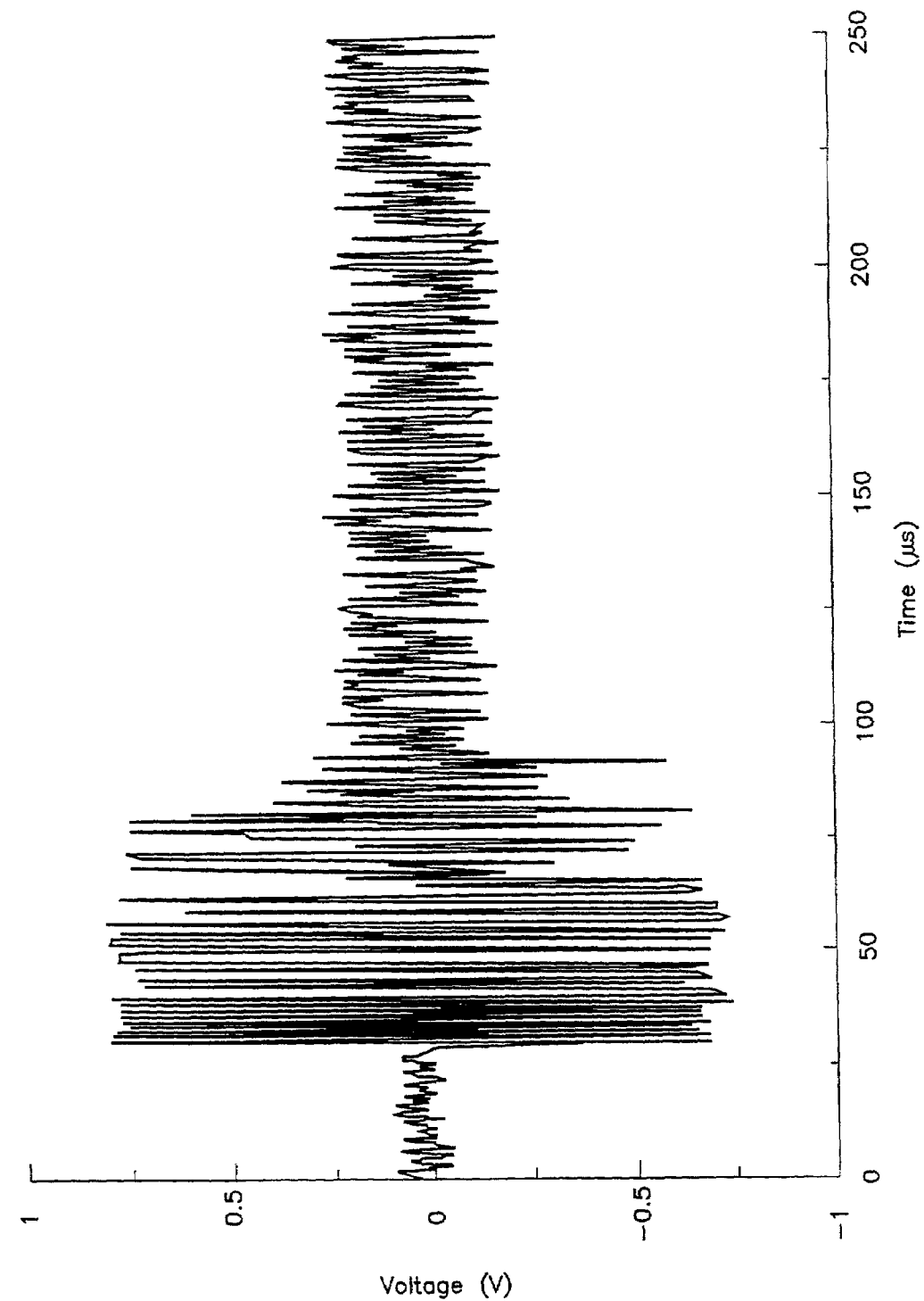
FIG. 16 shows a change in the output levels of the channel filters in response to a change in the amplitude of a receive burst.

All switched-capacitor stages in the baseband filters 108, peak detectors 146, and demodulator 110 employ correlated double sampling (CDS) to attenuate their offsets and 1/f noise. To minimize offsets due to mismatch in sampling switches, NMOS rather than CMOS switches have been used. The four clock signals include two-phase, non-overlapping and delayed phases that are driven by voltage doublers. Static charge pumps drive the gain selection switches in the baseband filters 108 and VGA. FIG. 15 shows the measured step response of the channel filters. FIG. 16 shows a change in the output levels of the channel filters in response to a change in the amplitude of a receive burst.

The selectivity, as shown in the table of FIG. 5, was measured by applying a −83 dBm desired signal, then increasing the power of an interferer until the BER reached $10^{-3}$. The difference between the power of the interferer and −83 dBm is the selectivity. This test was performed with the interferer within the desired channel as well as 1.5 MHz, 3 MHz, and 4.5 MHz from the carrier. When the interfering tone is 4.5 MHz from the carrier, the receiver's BER is limited by the linearity of the front end. Hence, this measurement represents the blocking performance of the receiver 126.

The foregoing description of the exemplary embodiment of the invention has been presented for the purposes of illustration and description. It is not intended to be exhaustive or to limit the invention to the precise form disclosed. Many modifications and variations are possible in light of the above teaching.

What is claimed is:

1. A single-chip transceiver comprising:
a single RF (radio frequency) combined input/output port in a time-division duplex (TDD) system;
a receiver including an amplifier with an impedance transformation network having an input and output terminal, the amplifier input and output terminal being coupled to the RF input/output port;
a baseband filter coupled to the amplifier;
a demodulator coupled to the baseband filter; and
a transmitter including a power amplifier with a matched impedance network having an input and output port, the output port of the power amplifier being coupled to the RF input/output port, wherein a synthesizer is coupled to the power amplifier.

2. The transceiver of claim 1, wherein the transceiver comprises complementary metal oxide semiconductor (CMOS) devices.

3. The transceiver of claim 1, wherein the RF combined input/output port interfaces with an external antenna.

4. The transceiver of claim 1, wherein the baseband filter comprises switched capacitor technology.

5. The transceiver of claim 1, wherein the synthesizer performs FSK modulation.

6. The transceiver of claim 1, wherein the amplifier input and output terminal interfaces with the external antenna without use of an antenna switch.

7. A single-chip direct conversion receiver, comprising:
an amplifier having an input terminal and an output terminal, the amplifier input terminal interfacing with an external antenna via a combined RF input/output port;
a mixer having an input and output terminal, the mixer input terminal being coupled to the amplifier output terminal;
a baseband filter coupled to the mixer, the baseband filter comprising switched capacitor technology; and
a demodulator coupled to the baseband filter.

8. The receiver of claim 7, wherein the receiver comprises complementary metal oxide semiconductor (CMOS) devices.

9. The receiver of claim 7, wherein the demodulator performs FSK modulation.

10. The receiver of claim 7, wherein the amplifier input and output terminal interfaces with the external antenna without use of an antenna switch.

11. A radio frequency transmitter comprising:
a power amplifier, the power amplifier including with a matched impedance network, the power amplifier having an input port and an output port, and
a synthesizer coupled to the input port of the power amplifier;
wherein the output port of the power amplifier is coupled to a combined RF input/output port, the combined RF input/output port being coupled to an antenna.

12. The transmitter of claim 11, wherein the transmitter operates in a TDD (time division duplex) system.

13. The transmitter of claim 11, wherein the transmitter comprises complementary metal oxide semiconductor (CMOS) devices.

14. The transmitter of claim 11, wherein the transmitter is to transmit signals to the antenna without use of an antenna switch.

* * * * *